United States Patent [19]

Serini et al.

[11] 3,804,349
[45] Apr. 16, 1974

[54] APPARATUS FOR CONTROLLING THE TENSION OF THE LINE IN A FISHING REEL

[75] Inventors: Henry O. Serini; Douglas Sutterfield, both of Glen Ridge, N.J.

[73] Assignee: Universal Tackle Corporation, Atlantic Highlands, N.J.

[22] Filed: Apr. 12, 1973

[21] Appl. No.: 345,641

[52] U.S. Cl............................................ 242/84.5 A
[51] Int. Cl............................................ A01k 89/02
[58] Field of Search... 242/84.5 A, 84.51 A, 84.5 R, 242/84.51 R, 84.21 R; 188/71.5, 71.6, 72.4; 192/85

[56] References Cited
UNITED STATES PATENTS

| | | | |
|---|---|---|---|
| 3,322,369 | 5/1967 | Haenelt, Jr. | 242/84.5 R |
| 3,185,406 | 5/1965 | Ament | 242/84.5 A |
| 3,144,217 | 8/1964 | Wood, Jr. | 242/84.21 R |

Primary Examiner—Billy S. Taylor
Attorney, Agent, or Firm—Sommers & Sommers

[57] ABSTRACT

An apparatus for controlling the tension of the line in a fishing reel which includes a spool which is connected to a crank and which is attachable to the handle of a fishing rod. Self-compensating alignment of the elements in a system for braking the rotation of the spool is provided by a snap ring, a retaining pin, and an actuating pin which cooperate with the braking system elements and which are retained in an annular groove, an aperture and slots in a hollow cylindrical shaft on which the spool is journalled. Dissipation of heat generated during braking is provided by tapered elements in the braking system. Sealing rings positioned in annular grooves in pistons, and a braking pressure transmitting medium located between the sealing rings, are provided in the hollow cylindrical shaft to interact with the braking system to maximize the adjustability and smoothness of operation of the braking pressure which is generated by an adjusting cap and which is transmitted through the hollow cylindrical shaft to the braking system. A resilient ring member fits onto the outer surface of the hollow cylindrical shaft and interacts with the braking system to provide biased return for reducing the braking pressure. A biased connector in the adjusting cap prevents extraneous forces from affecting the generated pressure which is transmitted to the braking system. A spherical member positioned intermediate the biased connector and pistons in the hollow cylindrical shaft prevents further variation of the generated pressure in transmission to the braking system, and a plug member is provided which seals the hollow cylindrical shaft to prevent tampering or disassembly.

9 Claims, 1 Drawing Figure

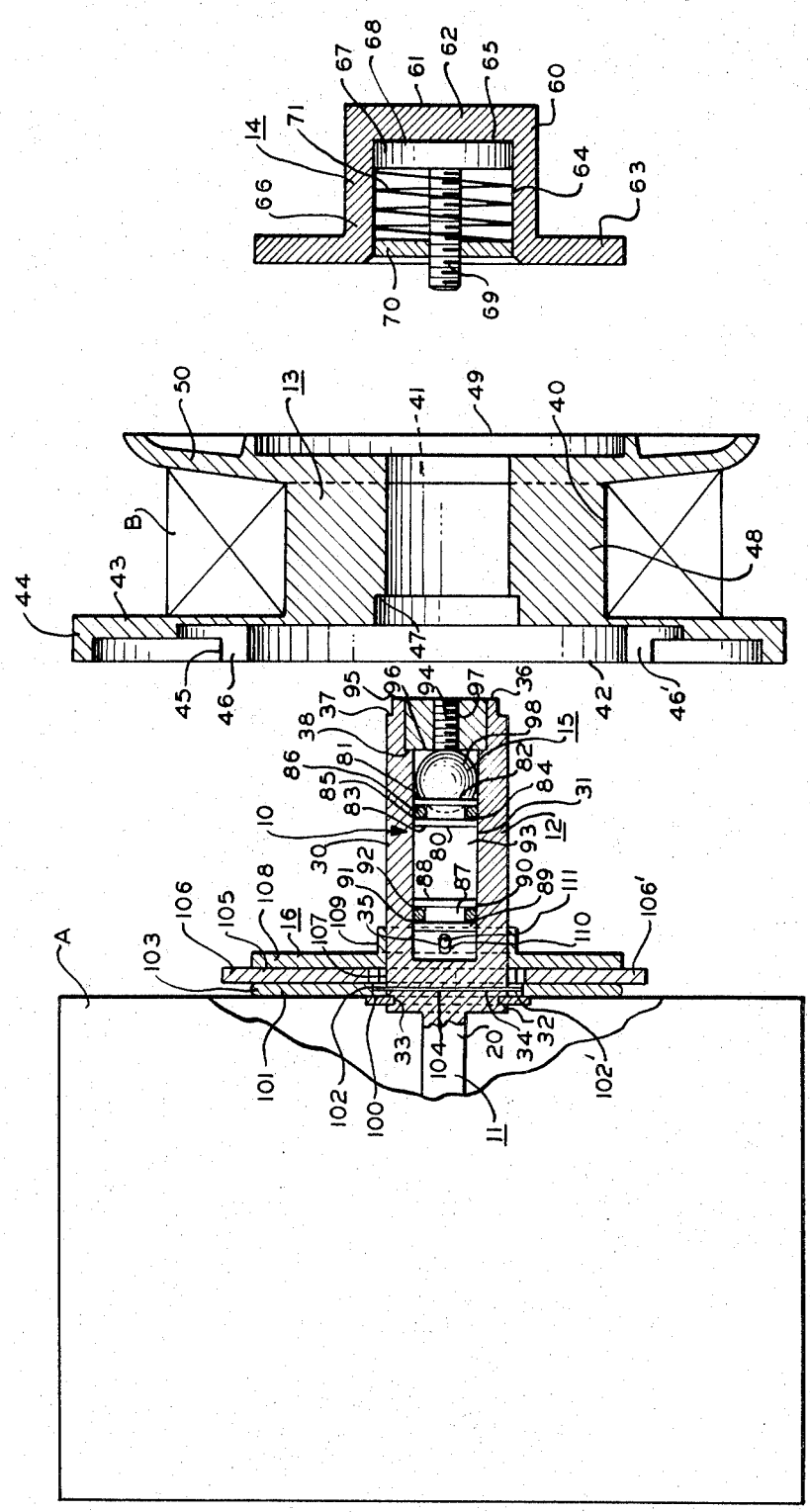

APPARATUS FOR CONTROLLING THE TENSION OF THE LINE IN A FISHING REEL

BACKGROUND OF THE INVENTION

This invention relates generally to fishing reels, and more specifically relates to an apparatus for controlling the tension of the line in a fishing reel.

Devices of the type intended to control the tension of the line in a fishing reel have been incorporated in conventional reels and fly reels, wherein the spool is driven by rotation of a crank which is connected to the spool through a clutch and drive gears, and in spinning reels, wherein the spool rotates only when the fish is running with the line but the spool is movable only in an axially-reciprocating manner for retrieval of the line and rotation of the crank rotates a casing with a bail mounted thereto for guiding the line about the spool. Fishing reel line tension control devices have been utilized heretofore to provide controlled line tension by braking rotation of the spool when a fish is hooked and is running with the line in order to prevent line breakage. Such devices have heretofore been provided with braking system elements which were mounted to the hollow cylindrical shaft (on which the spool was journalled) in a manner which increased the potential for improper alignment of the braking system elements with resultant incomplete or erratic application of braking pressure to the spool and variation in the tension of the line wound thereon. Heat generated during operation of the braking system was transmitted back to the braking pressure transmitting system and interfered with the operation thereof. The braking pressure transmitting system heretofore included operating elements which were slidably movable on side surfaces of substantial area along the inner surface of the hollow cylindrical shaft; the sliding movement of the side surfaces generated substantial frictional forces because of the substantial contact area, which prevented smooth operating element movement and precise adjustment of the system. Additional elements were required to return the braking pressure transmitting system to a reduced pressure condition, which elements were subject to wear, structural damage and adverse heat effects, with consequent variations in braking pressure. Minimal effort was required to obtain access to the elements in the hollow cylindrical shaft, with resultant increased potential for damaging or incapacitating the system. The braking pressure generating system was subject to vibration and orientation forces with consequent braking pressure variation, and direct contact of the adjusting cap connector with the transmitting system elements resulted in damage to the elements and pressure variation.

SUMMARY OF THE INVENTION

In accordance with the foregoing, it is an object of the present invention to provide self-compensating alignment of the elements in the braking system, to enable uniform application of braking pressure to the spool. Another object of the present invention is to dissipate the heat generated by the braking system, to prevent adverse heating effects on the braking pressure transmitting system.

It is a further object of the present invention to provide operating elements in the braking pressure transmitting system which include minimal-area side contact surfaces, to enable smooth sliding movement of the elements along the inner surface of the hollow cylindrical shaft, for uniform and continuous pressure transmission and for precise adjustability thereof. Another object of the present invention is to provide for biased return of the braking pressure transmitting system elements, to enable system return for reducing the braking pressure.

It is a further object of the present invention to enclose the operating elements in the hollow cylindrical shaft, to prevent tampering or disassembly. Another object of the present invention is to provide a biased connector from the pressure generating system which bears against a spherical member in the braking pressure transmitting system, to prevent vibration and orientation forces from affecting the braking pressure, and to prevent damage to the operating elements.

In accordance with the present invention, the foregoing objects and others are achieved, as will become apparent in the course of the ensuing specification, in an apparatus for controlling the tension of the line in a fishing reel, which includes means for braking the rotational movement of the spool, including a snap ring, a retaining pin, and an actuating pin which are retained in an annular groove, an aperture and slots in the hollow cylindrical shaft on which the spool is journalled, and which cooperate with a hollow back plate, which is outwardly tapered to provide dissipation of heat generated by braking, a hollow brake plate, and a hollow actuator plate, which are mounted to the hollow cylindrical shaft thereby, to provide self-compensating alignment, and a resilient ring member which fits onto the hollow cylindrical shaft and which interacts with the hollow actuator plate to provide biased return of the braking pressure transmitting system elements to enable system return for reducing the braking pressure, means for generating braking pressure, including a biased connector which prevents vibration and orientation forces from affecting the braking pressure, and means for transmitting braking pressure, including sealing rings positioned in annular grooves in pistons, which provide minimal-area side contact surfaces for sliding movement along the inner surface of the hollow cylindrical shaft for uniform and continuous braking pressure transmission and precise braking pressure adjustment, a spherical member which is interposed intermediate the piston and the biased connector to prevent damage and braking pressure variaton, and a plug member which seals the hollow cylindrical shaft to prevent tampering or disassembly.

DESCRIPTION OF THE DRAWING

The invention is diagramatically illustrated by way of example in the drawing appended hereto, wherein similar reference characters indicate like parts, in which the FIGURE is a side elevational exploded partly-sectional view of an apparatus for controlling the tension of the line in a fishing reel, in accordance with the invention.

DESCRIPTION OF THE PREFERRED EMBODIMENT

In accordance with the preferred mode of practicing the invention, the line tension control apparatus 10, as shown in the FIGURE mounted in the casing A of a spinning reel, for example, which is attachable to the handle of a fishing rod (not shown), comprises a cylindrical drive shaft 11, which is connected to a crank (not shown), a hollow cylindrical shaft 12 which is connected to the cylindrical drive shaft 11, a spool 13 on which the line B is wound, which is journalled on the hollow cylindrical shaft 12, means for generating braking pressure 14, which are connectable to the hollow cylindrical shaft 12, means for transmitting braking pressure 15, which are enclosed in the hollow cylindrical shaft 12, and means 16 for braking the rotational movement of the spool 13, which are keyed to the hollow cylindrical shaft 12.

The cylindrical drive shaft 11, for example, includes a first end portion 20.

The hollow cylindrical shaft 12, for example, includes an outer surface 30 and an inner surface 31, a first end portion 32 to which the cylindrical drive shaft first end portion 20 is connected, which includes an annular groove 33, an aperture 34, and aligned slots 35 therein, which are aligned on an axis which extends generally perpendicular to the axis of the aperture 34, and a second end portion 36 which includes an outside annular shoulder 37 and an inside annular shoulder 38 therein.

The spool 13, for example, includes an outer surface 40 and an inner surface 41, a first end portion 42 including a first end flange 43 which includes an outer annular rim 44 and an inner annular rim 45, with detent spaces walls 46, 46' (corresponding opposite walls of the detent spaces, and the detent spaces which are aligned in the inner annular rim 43, are not shown) and an inside annular shoulder 47, an axle portion 48 on which the line B is wound, and a second end portion 49 including a second end flange 50.

The braking pressure generating means 14 comprises, for example, an adjusting cap 60, including an outer surface 61 which includes a projecting portion 62 and a shoulder portion 63, an inner surface 64 which includes a front wall 65 and a side wall 66, and which, in the preferred embodiment is hexagonal in shape for the length thereof, a biased connector 67 which includes a head portion 68 which, in the preferred embodiment, is hexagonal in shape, and which is biased against the inner surface front wall 65, and a threaded body portion 69, a hollow sealing disc 70 which is secured to the inner surface side wall 66, and a biasing member 71 which bears against the biased connector head portion 68 at one end thereof, extends about the biased connector threaded body portion 69, and bears against the hollow sealing disc 70 at the other end thereof.

The braking pressure transmitting means 15 comprises, for example, a first piston 80 which includes a front surface 81 having a detent portion 82 therein, a back surface 83, a side surface 84 having an annular groove 85 therein, and a resilient ring member 86 positioned in the piston annular groove 85 which bears against the hollow cylindrical shaft inner surface 31, a second piston 87 which includes a front surface 88, a back surface 89, a side surface 90 having an annular groove 91 therein, and a resilient ring member 92 positioned in the piston annular groove 91 which bears against the hollow cylindrical shaft inner surface 31, a braking pressure transmitting medium 93 which, in the preferred embodiment, comprises non-compressible hydraulic fluid, located in the space in the hollow cylindrical shaft inner surface 31 between the resilient ring member 86 and the resilient ring member 92, a hollow plug member 94 which is mounted to the hollow cylindrical shaft 12 in the second end portion inside annular shoulder 38, and which includes a front surface 95, a back surface 96, and a threaded central portion 97, and a spherical member 98 which is interposed in the first piston detent portion 82 and which bears against the hollow plug member back surface 96.

The spool rotational movement braking means 16 comprises, for example, a snap ring 100 which fits into the hollow cylindrical shaft annular groove 33, a hollow back plate 101 which includes aligned slots 102, 102' therein and a tapered outer portion 103, a retaining pin 104 which extends through the aperture 34 in the hollow cylindrical shaft 12 and which is keyed in the aligned slots 102, 102' in the hollow back plate 101, a hollow brake plate 105 including outer aligned tang portions 106, 106', a resilient ring member 107 which fits onto the outer surface 30 of the hollow cylindrical shaft 12, a hollow actuator plate 108, which includes a hollow collar portion 109 with apertures 110, 110' therein, and an actuating pin 111 which extends through the aligned slots 35, 35' in the hollow cylindrical shaft 12 and the apertures 110, 110' in the hollow collar portion 109, and against which the second piston back surface 89 bears.

To assemble the line tension control apparatus 10, for example, the snap ring 100 is snapped into position in the annular groove 33 in the hollow cylindrical shaft outer surface 30, the retaining pin 104 is inserted through the aperture 34 in the hollow cylindrical shaft 12, the hollow back plate 101 is positioned on the hollow cylindrical shaft 12 such that the retaining pin 104 is keyed in the aligned slots 102, 102' therein, the resilient ring member 107 and the hollow brake plate 105 are positioned on the hollow cylindrical shaft 12, the hollow actuator plate 108 is positioned on the hollow cylindrical shaft 12 to bear against the resilient ring member 107 and the hollow brake plate 105, the actuating pin 111 is inserted through the apertures 110 in the hollow collar portion 109 of the hollow actuator plate 108 and the aligned slots 35 in the hollow cylindrical shaft 12, the second piston 87 is inserted into the hollow cylindrical shaft 12 such that the back surface 89 thereof bears against the actuating pin 111, the first piston 80 and the spherical member 98 are inserted into the hollow cylindrical shaft 12, the hollow plug member 94 is seated in the inside annular shoulder 38 in the hollow cylindrical shaft 12, the braking pressure transmitting medium 93 is injected into the space between the resilient ring member 86 and the resilient ring member 92, the hollow plug member 94 front surface 95 is sealed to the second end portion 36 of the hollow cylindrical shaft 12, the spool 13 is journalled onto the hollow cylindrical shaft 12 by sliding the spool 13 on the inner surface 41 thereof along the hollow cylindrical shaft outer surface 30 until the spool inside annular shoulder 47 bears against the hollow collar portion 109 and the hollow brake plate outer aligned tang portions 106, 106' are keyed into the detent spaces (not shown) in the spool first end flange 43 inner annular rim 45, and the adjusting cap 60 biased connector threaded body portion 67 is threaded into the hollow plug member 94 central threaded portion 97 whereby the adjusting cap 60 hollow sealing disc 70 bears against the hollow cylindrical shaft 12 second end portion 36.

To increase the braking pressure applied to the spool 13, in order to increase the tension in the line B which is wound on the spool 13, the operator turns the adjusting cap 60 to direct the biased connector threaded body portion 69 through the hollow plug member threaded central portion 97 and against the spherical member 98, which in turn transmits the increased braking pressure generated thereby through the first piston 80, the braking pressure transmitting medium 93 and the second piston 87, and through the actuating pin 104 which moves in the aligned slots 35 and the apertures 110, to hollow collar portion 109 and the hollow actuator plate 108, and through the hollow brake plate 105 which applies the increased braking pressure through the aligned outer tang portions 106, 106' thereof to the spool 13 first end flange inner annular rim 45 detent spaces walls (46, 46' shown, opposite walls not shown).

To reduce the braking pressure applied to the spool 13, in order to reduce the tension in the line B which is wound on the spool 13, the operator generates reduced braking pressure by turning the adjusting cap 60 to direct the biased connector threaded body portion 69 out of the hollow plug member threaded central portion 97, in contact with the spherical member 98 which is urged to bear thereagainst by the first piston 80 through the braking pressure transmitting medium 93, which in turn transmits the reduced braking pressure through the second piston 87, the actuating pin 104, the hollow collar portion 109, and through the hollow actuator plate 108 which is biased by the resilient ring member 107 to release the pressure on the hollow brake plate 105 as applied through the hollow actuator plate 108, which applies the reduced braking pressure through the aligned outer tang portions 106, 106' thereof to the spool 13 first end flange inner annular rim 45 detent spaces walls (46, 46' shown, opposite walls not shown).

In the operation of the line tension control apparatus 10, the snap ring 100, which is retained in the hollow cylindrical shaft 12 annular groove 33, the retaining pin 104, which extends through the hollow cylindrical shaft 12 apertures 34 and the hollow back plate 101 aligned slots 102, 102', and which enables the hollow back plate 101 to move pivotally while preventing rotational movement thereof, and the actuating pin 111, which extends through the hollow cylindrical shaft 12 aligned slots 35 and the hollow collar plate 109 apertures 110, which are aligned on an axis which extends generally perpendicular to the axis of alignment of the aperture 34 and aligned slots 102, 102' and which enable pivotal movement of the hollow actuator plate 108 while preventing rotational movement thereof, cooperate with the hollow back plate 101, the hollow brake plate 105, and the hollow actuator plate 108, to provide self-compensating alignment of the spool rotational movement braking means 16. The biased hollow sealing disc 70 is urged to bear against the hollow cylindrical shaft 12 second end portion 36 by the biasing member 71 to prevent braking pressure viaration due to vibration or change in orientation of the apparatus. The resilient ring member 86 in the first piston 80 and the resilient ring member 92 in the second piston 87, which slide along the hollow cylindrical shaft 12 inner surface 41, present minimal-area side contact surfaces, which enable uniform and continuous braking pressure transmission and precise braking pressure adjustability. The resilient ring member 107 which bears against the hollow actuator plate 108 provides biased return of the actuating pin 111, second piston 87, braking pressure transmitting medium 93, first piston 80, and spherical member 98, for reducing the braking pressure. The hollow back plate tapered outer portion 103 is outwardly tapered to dissipate heat generated by braking. The spherical member 98 is interposed intermediate the first piston front surface 81 and the hollow plug member back surface 96 to prevent damage to the piston on braking pressure variation. The hollow plug member 94 in the inside annular shoulder 38 is sealed to the hollow cylindrical shaft 12 to prevent tampering with the elements therein.

While the present invention has been particularly set forth in terms of a specific embodiment thereof, it will be understood in view of the instant disclosure that numerous variations upon the invention are now enabled to those skilled in the art, which variations in propriety are within the scope of the instant teaching. Accordingly, the invention is to be broadly construed and limited only by the scope and spirit of the claims now appended hereto.

We claim:

1. An apparatus for controlling the tension of the line in a fishing reel, which comprises:
   a. a hollow cylindrical shaft, which includes an outer surface, an inner surface, and an end portion;
   b. means for driving the hollow cylindrical shaft;
   c. a spool, which is journalled on the hollow cylindrical shaft and on which the line is wound;
   d. means for generating braking pressure, which are connectable to the end portion of the hollow cylindrical shaft;
   e. means for transmitting braking pressure, which are connectable to the braking pressure generating means, and which are enclosed in the hollow cylindrical shaft, which include:
      1. a first piston, which includes a first end surface, a second end surface, a side surface having an annular groove therein, and a first resilient ring member in the side surface annular groove which bears against the hollow cylindrical shaft inner surface;
      2. a second piston, which includes a first end surface, a second end surface, a side surface having an annular groove therein, and a second resilient ring member in the side surface annular groove which bears against the hollow cylindrical shaft inner surface, and wherein the second piston first end surface is spaced from the first piston first end surface in the hollow cylindrical shaft; and
      3. a braking pressure transmitting medium, in the space between the first resilient ring member and the second resilient ring member in the hollow cylindrical shaft; and
   f. means for braking the rotational movement of the spool, which are mounted on the hollow cylindrical shaft, which are engageable with the braking pressure transmitting means and which are engageable with the spool.

2. A line tension control apparatus as recited in claim 1, in which the hollow cylindrical shaft further includes an annular groove adjacent the first end portion, an aperture which is axially spaced from the annular groove, and a pair of aligned slots which are axially spaced from the aperture, and in which the spool rotational movement braking means are keyed to the hollow cylindrical shaft annular groove, aperture, and aligned slots.

3. A line tension control apparatus as recited in claim 1, in which the spool comprises an outer surface, an inner surface, a first end portion, which includes a first end flange including an outer annular rim, an inner annular rim having aligned detent spaces therein, and an inside annular shoulder, an axle portion, and a second end portion which includes a second end flange.

4. A line tension control apparatus as recited in claim 1, in which the braking pressure generating means comprises an adjusting cap, which includes an outer surface, including a projecting portion and a shoulder portion, and an inner surface including a front wall and a side wall, a biased connector, which includes a head portion, which bears against the adjusting cap inner surface front wall, and a threaded body portion, which is connectable to the hollow cylindrical shaft second end portion, a hollow sealing disc, which is secured to the adjusting cap inner surface side wall, and a biasing member, which bears against the biased connector head portion at one end thereof, extends about the biased connector threaded body portion for the length thereof, and bears against the hollow sealing disc at the other end thereof.

5. A line tension control apparatus as recited in claim 1, in which the hollow cylindrical shaft second end portion includes a an outside annular shoulder and an inside annular shoulder, and the braking pressure transmitting means further includes a hollow plug member, which is mounted to the hollow cylindrical shaft second end portion inside annular shoulder, including a first end surface, a second end surface, and a threaded central portion.

6. A line tension control apparatus as recited in claim 2, in which the spool rotational movement braking means comprises an annular ring member, which fits into the hollow cylindrical shaft annular groove, a hollow back plate, which bears against the annular ring member, and which includes a pair of radially-aligned axially-extending slots in the hollow portion thereof, a retaining pin, which extends through the hollow cylindrical shaft aperture and the hollow back plate radially-aligned axially extending slots, a resilient ring member, which bears against the hollow back plate, a hollow brake plate, which bears against the hollow back plate and which extends about the resilient ring member, and which includes outer aligned tang portions which are engageable in the spool aligned detent spaces, a hollow actuator plate, which bears against the hollow brake plate and the resilient ring member, including a hollow collar portion which includes a pair of apertures, and an actuating pin, which extends through the hollow cylindrical shaft aligned slots and the hollow collar portion apertures, and which bears against the second piston second end surface.

7. A line tension control apparatus as recited in claim 5, in which the braking pressure transmitting means further includes a spherical member, interposed in the hollow cylindrical shaft intermediate the first piston second end surface and the hollow plug member second end surface.

8. A line tension control apparatus as recited in claim 6, in which the hollow cylindrical shaft aligned slots are aligned on an axis which extends generally perpendicular to the axis of alignment of the hollow cylindrical shaft aperture.

9. A line tension control apparatus as recited in claim 8, in which the spool rotational movement braking means hollow back plate further includes outwardly tapered outer portions.

* * * * *